United States Patent [19]

Levy et al.

[11] Patent Number: 4,636,074
[45] Date of Patent: Jan. 13, 1987

[54] OPTICS SYSTEM FOR EMISSION SPECTROMETER

[75] Inventors: Gilbert M. Levy, Toronto; Alexander Quaglia; Robert E. Lazure, both of London, all of Canada

[73] Assignee: PRA International Inc., London, Canada

[21] Appl. No.: 679,080

[22] Filed: Dec. 6, 1984

[51] Int. Cl.$^4$ .................. G01J 3/443; G01J 3/18
[52] U.S. Cl. ..................... 356/328; 356/316; 356/333; 356/334; 356/305
[58] Field of Search ............ 356/302, 303, 305, 310, 356/311, 313, 315–319, 326, 330–334, 328

[56] References Cited

U.S. PATENT DOCUMENTS

| | | | |
|---|---|---|---|
| 3,052,154 | 9/1962 | Bolz | 356/310 |
| 3,837,744 | 9/1974 | Egan et al. | 356/310 |
| 3,958,883 | 5/1976 | Turner | 356/305 |
| 4,025,196 | 5/1977 | Chupp et al. | 356/334 |
| 4,049,353 | 9/1977 | Missio | 356/310 |
| 4,111,556 | 9/1978 | Grisar et al. | 356/303 |
| 4,193,691 | 3/1980 | Fjarlie | 356/330 |
| 4,330,210 | 5/1982 | Hashimoto et al. | 356/328 |
| 4,371,263 | 2/1983 | Witte | 356/333 |
| 4,482,966 | 11/1984 | Mito et al. | 356/328 |

FOREIGN PATENT DOCUMENTS

| | | | |
|---|---|---|---|
| 0108740 | 7/1982 | Japan | 356/326 |
| 0619805 | 8/1978 | U.S.S.R. | 356/334 |

OTHER PUBLICATIONS

Boland et al., *Solar Physics*, vol. 17, No. 2, 1971, pp. 333–354.

*Primary Examiner*—F. L. Evans
*Assistant Examiner*—Joel L. Harringa
*Attorney, Agent, or Firm*—Sim & McBurney

[57] ABSTRACT

An optical arrangement for use in spectrometry uses a masking device which eliminates unwanted spectral regions prior to optically resolving the unmasked information. The optical arrangement comprises an entrance slit to select incidence spectral energy from an energized source and a concave grating of relatively low dispersion to image the spectrum of the entrance slit onto a stationary mask which simultaneously selects spectral regions of the dispersed incident spectral energy. The selected spectral regions are collimated and recombined and directed onto an Echelle grating to disperse with high resolution the selected spectral regions. A concave mirror focuses the dispersed selected spectral regions into a focal plane of highly resolved spectral energy which can be detected to determine the spectral information coming from the source. The optical arrangement is particularly well suited for use with narrow spectral bandwidth spectral information distributed over a large spectral range. In spectroscopy, desired information very often occupies a tiny fraction of the total spectral information presented to a spectrometer. With this optical arrangement, spectral information can be selected from a much broader band spectral information and collected with high resolution on a small curvilinear portion of the output focal plane. The arrangement is particularly useful for absorption, light scattering or emission spectroscopy. It provides a stable mechanical design making it less sensitive to vibration. Manufacturing mechanical tolerances are also less restrictive.

45 Claims, 6 Drawing Figures

FIG.4.

| ORDER | WAVELENGTH RANGE OF EACH ORDER |
|---|---|
| 140 | 3990.3 —————— 4018.9 |
| | 3962.1 —————— 3990.3 |
| | 3934.3 ——————+ 3962.1 |
| | 3906.8 —————— 3934.3 |
| | ↓ ↓ |
| | 3800.9 —————— 3826.8 |
| | 3775.3 ——————+ 3800.9 |
| | 3750.1 —————— 3775.3 |
| | ↓ ↓ |
| | 3628.7 —————— 3652.3 |
| 155 | 3605.4 ——————+ 3628.7 |
| | 3582.3 —————— 3605.4 |
| | 3559.6 ——————+ 3582.3 |
| | 3537.1 —————— 3559.6 |
| | ↓ ↓ |
| 165 | 3387.5 —————— 3408.1 |
| | 3367.2 ——————+ 3387.5 |
| | 3347.1 —+—————— 3367.2 |
| | 3327.2 —————— 3347.1 |
| | ↓ ↓ |
| | 3250.1 —————— 3269.0 |
| | 3231.3 ——————+ 3250.1 |
| | 3212.8 —————— 3231.3 |
| 175 | 3194.5 —————— 3212.8 |
| | ↓ ↓ |
| | 2796.2 —————— 2810.2 |
| 201 | 2782.3 ——————+ 2796.2 |
| | 2768.6 —————— 2782.3 |
| | ↓ ↓ |
| | 2601.6 —————— 2613.7 |
| | 2589.5 ——————+ 2601.6 |
| 217 | 2577.6 —————— 2589.5 |
| | ↓ ↓ |
| 222 | 2519.7 —————— 2531.1 |
| | 2508.4 ——————+ 2519.7 |
| | 2497.3 —————— 2508.4 |
| | 2486.2 —————— 2497.3 |
| | 2475.2 —————— 2486.2 |
| 227 | 2464.3 —————— 2475.2 |
| | ↓ ↓ |
| 247 | 2265.2 —————— 2274.4 |

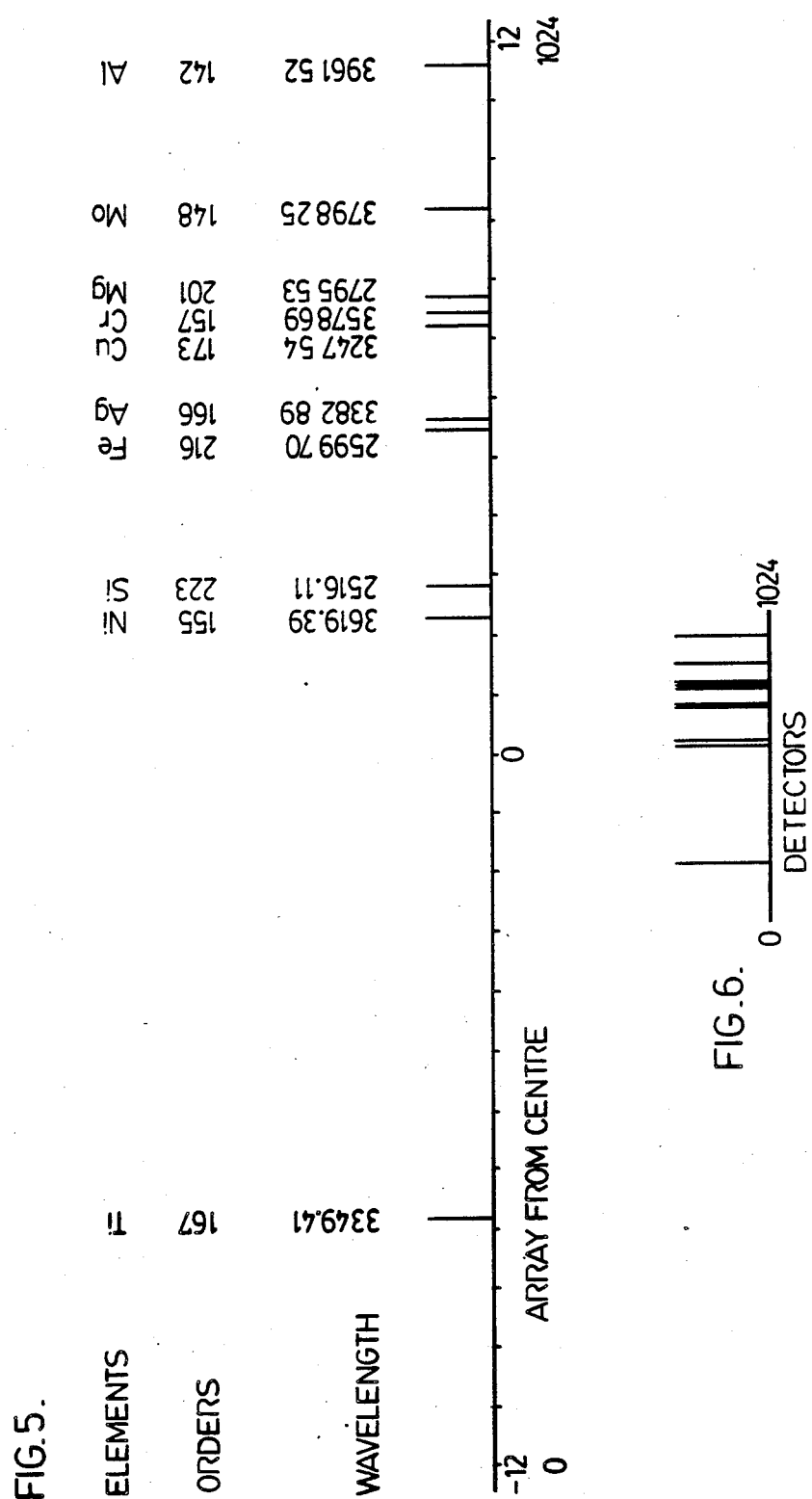

OPTICS SYSTEM FOR EMISSION SPECTROMETER

FIELD OF THE INVENTION

This invention relates to method and apparatus for sorting spectral energy and in particular, the sorting of spectral energy for use in association with spectroscopy.

BACKGROUND OF THE INVENTION

In many spectroscopy applications, it is desirable to measure the spectra of a number of narrow spectral regions with high resolution; the narrow spectral regions being distributed more or less at random throughout a much broader overall spectral region. These narrow spectral regions are often referred to as spectral lines. For example, in absorption, emission or light scattering spectroscopy, the total region spanned by all sections of interest may be several thousands of Angstroms (100's of nanometers), while spectral measurements are actually needed for one or more narrow spectral regions having a span of less than one Angstrom at a resolution of the order of 0.1 Angstrom in the vicinity of particular spectral lines.

The total number of measurements wanted may be rather large. A certain amount of time is generally needed to make each measurement with adequate precision and there is the additional need to search out the appropriate spectral region for each line. As a result, the total amount of time required to scan, locate spectral regions, and carry out measurements can become quite large.

To deal with this type of application, there are commercially available two basic forms of dispersive spectrometers. The scanning spectrometer sweeps all of the wavelengths of the spectrum using a single detector to determine the presence of spectral lines in the sample being analyzed. The scanning spectrometer is slow and can only sense one narrow spectral band at one time. Another form of spectrometer has a plurality of detectors which can simultaneously select spectral energy lines in regions of interest. This type of spectrometer sometimes uses a separate exit slit photodetector and amplifier channel for each of the spectral energy lines to be measured. Some scanning is generally needed to examine the spectral region surrounding each line. For a given spectral resolution, the first method is slow and the second method expensive and not versatile.

An improvement in dispersive spectrometers is disclosed in U.S. Pat. No. 3,700,332. It is directed to an absorption spectrometer which involves the use of a controlled vibrating chopping mask. A photoelectric detector receives stepwise a series of chopped line and band flux intensities from different selected portions of the spectrum and generates a group of electrical values, each porportional to the total flux transmitted through each array. A Hadamard matrix is used to analyze the light flux for each spectral line. This system involves several moving components including the vibrating chopping mask. Thus, the system must be isolated from surrounding ambient vibration to provide the needed accuracy. It also requires the complex mathematical Hadamard analysis.

A correlation absorption spectrometer is disclosed in U.S. Pat. No. 3,955,891. The spectrometer has first and second spatial filters with a chopping device to alternately block light from the first filter onto two filter portions of the second filter. A weighted linear combination of the intensities of the selected wavelength interval of light from the light source is used. By way of a Hadamard matrix, the results are analyzed.

Another improvement in dispersive spectrometers is described in U.S. Pat. Nos. 3,752,585 and 4,049,353 and Canadian Pat. No. 896,652 which relate to various cross-dispersive spectrometer configurations using an Echelle grating for providing high resolution of the spectral energy lines. A rotatable prism is used in conjunction with a movable Echelle grating to provide a two dimensional spectral energy distribution in a rectangular focal plane. A cassette is used with an encoding disc to determine if spectral energy lines are present for atoms corresponding to the position of openings in the cassette. According to the improvement of U.S. Pat. No. 4,049,353, the cassette is used in conjunction with a two dimensional array of photomultiplier tubes to determine if spectral energy lines are present at the opening in the cassette. The use of a movable prism and Echelle grating in conjunction with the cassette requires extreme precision in set-up to avoid inaccuracy in readings. The machine is also very susceptible to vibration caused by the surroundings. The unit is not readily interchangeable to sense various elements because the cassette positioning has to be very accurate to decipher all the spectral energy information arriving at the cassette. This makes the cassette very expensive. The use of cross-dispersion also limits the allowable entrance slit height on this spectrometer. In turn, this reduces the light gathering capability of the instrument. A similar type of system is disclosed in U.S. Pat. No. 4,391,523 to Leeman Labs Inc.

There also exists cascade spectrometer arrangements where the first monochromator is used to select a single spectral region of interest and pass that single spectral region to a second spectrometer which disperses that single region to analyze specific spectral energy lines of the single spectral region. The advantage is that the first monochromator selects a narrow spectral region which is then resolved in higher resolution by the second spectrometer. The disadvantage is that only one narrow spectral region can be selected at any given time. Therefore, to determine spectral information in widely separated parts of a larger spectral region, the two monochromators must be scanned. This method is both slow and expensive.

SUMMARY OF THE INVENTION

According to an aspect of the invention, a new method is provided for analyzing spectral energy emissions from a source. The method comprises dispersing incident spectral energy, then simultaneously selecting multiple spectral regions of the dispersed spectral energy. The simultaneously selected spectral regions of spectral energy are then recombined and further dispersed and the dispersed selected spectral regions are organized into a detectable spectral energy distribution pattern.

According to another aspect of the invention, a method is provided for spectrometrically determining the presence of one or more suspected components in a sample. The method comprises passing incident spectral energy from an energized source including the sample through a slit to select incident spectral energy from the source. The incident spectral energy is dispersed and focused at a focal plane. Predetermined spectral energy regions of the focused dispersed spectral energy are simultaneously selected at the focal plane. The unwanted spectral regions are rejected. The optical beam of the selected spectral regions is collimated and recombined and directed onto an Echelle grating to disperse with high resolution the selected spectral regions. The dispersed selected spectral regions are then focused onto a focal plane. The presence and relative location of the spectral energies are detected to confirm the presence of suspected one or more components in the sample.

According to another aspect of the invention, apparatus is provided for analyzing spectral energy emissions from a source. The apparatus comprises first means for dispersing incident spectral energy to form a spectrum. Means is provided for simultaneously selecting multiple spectral regions from the spectrum. Means is provided for recombining the simultaneously selected spectral regions. Second means is provided for the additional dispersion of and organization of the dispersed spectral regions in a detectable spectral energy distribution pattern.

According to a further aspect of the invention, an Echelle spectrometer is provided for spectrometrically determining the presence and amount of one or more suspected components in the sample. The apparatus comprises an entrance slit to select incident spectral energy from an energized source including the sample. First means is provided for dispersing the isolated incident spectral energy and focusing the dispersed spectral energy at a first focal plane. Means is provided for simultaneously transmitting only selected spectral regions at said focal plane of the dispersed incident spectral energy. Means is provided for collimating and recombining the selected spectral regions and directing them onto an Echelle grating to disperse with high resolution the existing selected spectral regions. Means is provided for focusing the selected spectral regions dispersed by the Echelle grating onto a second focal plane. Means is provided for detecting the presence and relative location of the spectral energy. The means for transmitting selected spectral regions only transmits spectral regions which avoids appreciable overlap of the important spectral energy lines of the organized spectral energy distribution pattern.

The method and apparatus, according to aspects of this invention, may also determine quantitatively the amount of suspected one or more components in the sample by detecting the intensity of the representative spectral line or lines of the suspected component.

BRIEF DESCRIPTION OF THE DRAWINGS

A preferred embodiment of the invention is shown in the drawings wherein:

FIG. 4 is a representative plot of spectral orders dispersed from an Echelle grating showing the approximate positions of the spectral lines shown in FIG. 2;

FIG. 5 is a plot showing the relative position of the selected dispersed and focused spectral lines at the detector; and FIG. 6 shows the actual spectral line positions of FIG. 5 as located along the plane of the detector.

DETAILED DESCRIPTION OF THE PREFERRED EMBODIMENTS

Figure 1:
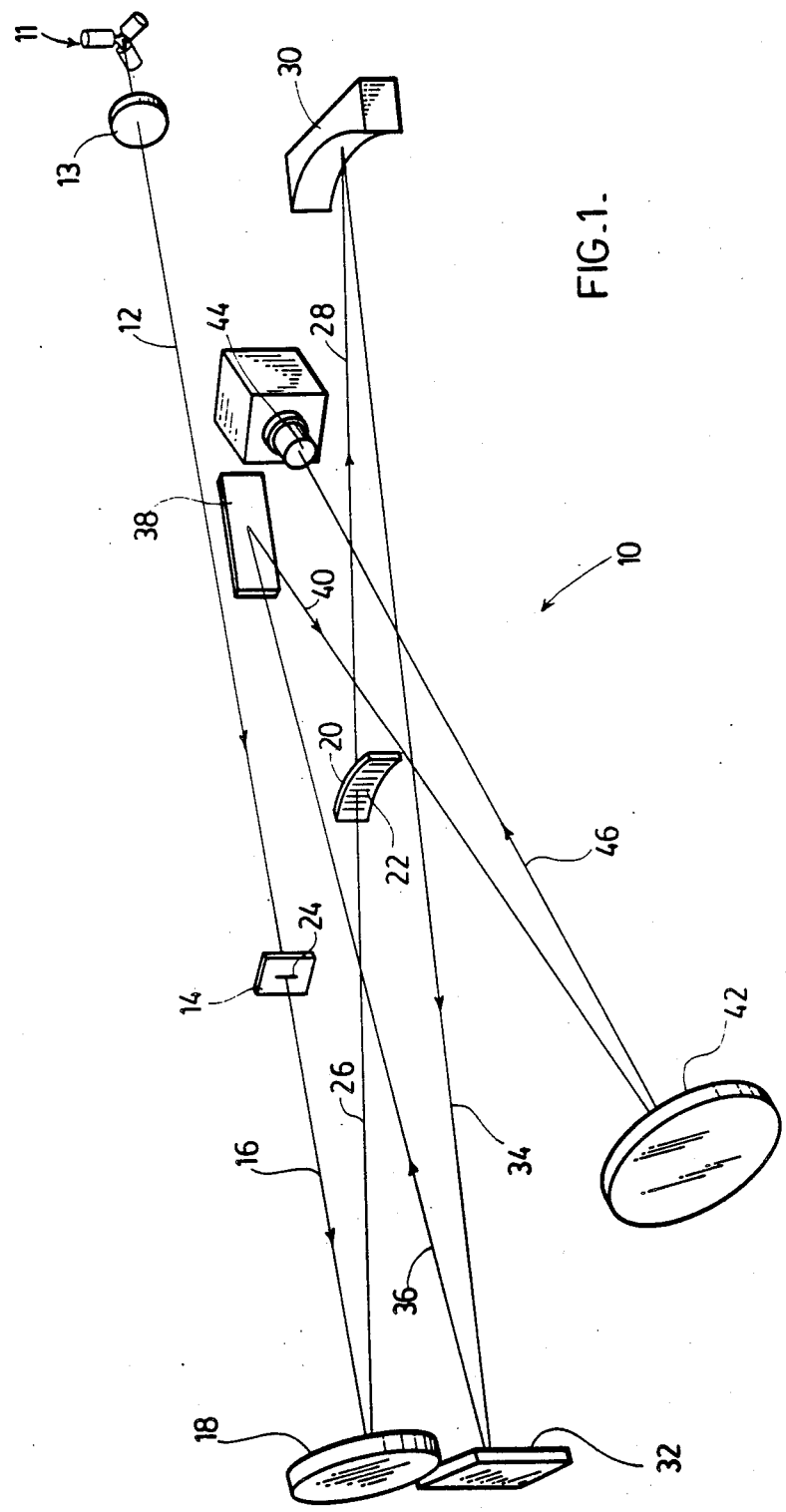
FIG. 1 is a perspective view of the optics of the apparatus according to this invention for sorting spectral energy.

The perspective view of FIG. 1 shows the special relationship of the optics 10 for use in a spectrometer. A source of incident radiation 12 is, in accordance with this embodiment of the invention, developed by a plasma of the standard type used in emission spectrometry. The radiant energy, from the plasma jet 11, into which a sample to be analyzed has been injected, is focused by lens 13 towards entrance slit 14. The entrance slit 14 isolates the incident energy to provide a beam of light 16 which is directed towards a concave reflective grating 18. The concave grating 18 functions to disperse the isolated incident spectral energy and to focus the dispersed spectral energy at a curved focal surface at which is located a mask 20. The concave grating 18 is designed to provide low dispersion of the incident spectral energy with low resolution of the spectral energy lines. It is appreciated that low and high resolution are relative terms in the field of spectroscopy. Specific values for low and high resolution will depend on the particular apparatus used and the regions of the spectrum to be analyzed. For purposes of discussion with respect to particular optics for the apparatus of FIG. 1, low resolution is considered to be in the order of 35 Angstroms/millimeter for the central wavelength of 3000 A.

The mask 20 is located at the focal surface of the concave grating known as the Rowland Circle. The mask has a plurality of slots 22 provided therein which are oriented parallel to the image of the entrance slit 14 formed at the position of the mask 20. The slots 22 in the mask 20 are located so as to pass or transmit spectral radiation in regions of the spectral energy which are of interest, in accordance with a predetermined scheme to be discussed. The mask portions between the slots 22 reject all remaining spectral energy which is unwanted. The characteristics of the concave grating 18 fix the location along the focal plane and the mask 20 of the various spectral regions for any wavelength in the incident spectral energy of a compound of interest. By knowing in advance the wavelengths of the spectral regions which are of interest in the spectrometric analysis, it is possible to position the slots in the mask to pass only the desired spectral regions of energy.

Thus the mask 20 serves to select simultaneously spectral regions of the dispersed spectral energy incident on the mask along line 26. The simultaneously selected spectral regions, which are present due to the existence of a suspected compound and which emerge from the mask 20, pass along line 28 onto a corrective mirror 30. The corrective mirror is a concave reflective surface for collimating the spectral regions and directing them towards the planar grating 32 along line 34. The planar grating 32 serves to orient all of the columns of the selected spectral regions so that the collimated light along line 34 is recombined into an essentially single column of light along line 36 which contains all of the selected spectral regions of energy.

With all of the spectral regions collimated on top of each other along line 36, the selected spectral regions are dispersed by an Echelle grating 38 which disperses the radiation about line 40 providing high resolution of the spectral energy lines of the selected spectral regions. As with particular values for low resolution of the spectrum, particular values for high resolution cannot be defined without reference to the apparatus used and spectral region being considered. However, for example, with the criteria for establishing low resolution value, corresponding high resolution value is in the order of 0.9 Angstroms/millimeter for the central wavelength of 3000 A.

The highly resolved spectral energy lines of the stacked orders of the spectral regions are directed along line 40 to a focusing mirror 42 which organizes by focusing all of the dispersed spectral energy regions along line 46 onto a focal plane at detector 44. Depending on the characteristics of the optics of the system, the focal plane may be curvilinear or planar at the detector 44. The detector determines the presence of the spectral energy lines at various positions along the horizontal dimensional length of the focal plane at the detector 44. The optical characteristics of the system, particularly the Echelle grating 38 and the wavelengths which should be present if the suspected components are in the energized source, determine where the spectral energy lines will fall at the focal plane at detector 44. If the detector registers the appearance of a spectral energy at a particular location along the length of the detector, it may confirm thereby the presence and possibly the amount of a suspected component in a sample.

The design of the optical components is in accordance with spectrometric standards. It is appreciated that with the particular arrangement, the gratings 18 and 32 are nearly coincident, and placed near the centre of curvature of the corrective mirror 30. The concave grating 18 then has a radius of curvature one-half that of the corrective mirror 30, and has the same line spacing as the planar grating 32 to provide the proper dispersion compensation and collimation of the transmitted radiation.

The Echelle grating has the characteristics of dispersing the selected spectral regions in numerous orders to that all orders of the spectral regions are dispersed one on top of the other. The selection of the spectral regions at the mask may, therefore, be affected by the scheme of stacked orders of the highly resolved spectral energy lines from the Echelle grating. In order to provide clearest determination of suspected compounds or elements in a sample, the highly resolved spectral energy lines of the elements should not appreciably overlap in the stacked orders of spectral energy. Knowing the spectral emission or absorption characteristics of each suspected element to be detected and the optical characteristics of the Echelle, one can judiciously select the location of slots in the mask to ensure that the resultant highly resolved spectral energy lines of the elements present do not overlap energy lines of the elements present do not overlap appreciably in the stacked orders of spectral energy produced by the Echelle grating. One may also provide means to alternately block one or more of the slots, to alleviate overlap problems, due to overlapping of spectral lines in different spectral orders. It is appreciated that for any one selected spectral region, there can be inherent overlap of spectral energy lines. With respect to unimportant spectral energy lines, overlap is acceptable because these unimportant lines normally are not detected. Furthermore, in other circumstances, there may even be overlap of important spectral energy lines in either a selected spectral region or spectral energy lines from different orders of the dispersed spectral energy. Depending upon the use to which the spectrometer is put, overlap of important spectral energy lines may not be a problem because, for example, mathematical techniques can be employed to resolve the overlap and determine the presence of the components represented by the overlapping important spectral energy lines. Generally from an analytical standpoint, appreciable overlap of the important spectral energy lines can be avoided by this judicious selection of the location of the slots in the mask, or by blocking one or more of the slots during the process, or use of the apparatus according to this invention. As to the selective blocking of one or more slots in the mask to avoid overlap of orders of spectral energy lines, this may be accomplished by locating a second mask near the first which physically blocks out selected spectral energy emerging from the slot of the first mask. Alternately, the blocking of the unwanted order of spectral energy emerging from the mask may be accomplished with transmission filters.

The detector 44 may be a simple photographic plate which, when developed and having a base line calibration, shows the relative location and intensity of various spectral energy lines so that upon measuring from the base line location, one can determine by presence and location of the spectral energy line that it is a positive identification of a suspected element in the sample. A television camera may also be suitably used for the detector 44. Multiple-anode microchannel photomultipliers will be very effective detectors when these become readily available. According to a preferred embodiment of the invention, a linear diode array is particularly suitable for use as a detector located where the focusing mirror 42 focuses the highly resolved spectral energy lines of the selected spectral regions into a linear pattern.

Linear diode arrays are now available containing many hundreds of detector elements. By use of the optics, according to this invention, all of the spectral information is focused onto a single dimension plane which enables detection of all of the information across the width of a linear diode array having a plurality of sensitive regions. The Echelle grating effectively divides the spectrum into spectrally narrower regions or orders and disposes them all one on top of the other in the same direction. By the judicious selection of the slot locations in the mask, the linear diode array is used in combination with an Echelle grating to sense the presence of selected spectral energy lines which are produced by suspected components in the sample.

This arrangement eliminates the need for former uses of cross-dispersing systems in combination with Echelle gratings, such as disclosed in the aforementioned United States patents and has the advantage of allowing a long entrance slit to be used. It further eliminates the need to provide a scanning device for scanning several spectral regions having wide separation.

Based on this discussion of the optics of FIG. 1, the optical arrangement of this invention overcomes various problems by using a low resolution spectrograph to isolate simultaneously desired spectral regions of interest and remove unwanted spectral regions. The masked radiation is then collected and sent to a high resolution Echelle spectrograph. A linear detector array is placed at the Echelle spectrograph focus. The selected spectral regions appear at the Echelle focus in high dispersion generally falling on separate sections of the detector array. Depending upon the characteristics of the optics used and the wavelength of the radiation being investigated, the width of the focused spectral energy lines on the detector is relatively narrow. In considering wavelength in the region of 2000 to 4000 Angstroms, the focused width of the spectral energy lines may be in the range of 25 mm.

There is no need to carry out mechanical scanning by use of sensitive components to access the separate regions wanted for a particular set of measurements, provided the spectral energy lines of the selected regions do not appreciably overlap. Masks may be generated providing large numbers of slots to cover a wide range of measurements. The invention provides a means of selecting sections from various orders of an Echelle spectrograph without movement of any optically sensitive components. That is, all optical components of the system are fixed, except for the possible use of an interchangeable mask, or the alternate covering and uncovering of sections of a given mask. However, the mask's angular position is always fixed relative to the other components for detecting the presence of one or more components in the source.

It is understood that many optical configurations can be implemented for the sorting of spectral energy. For example, the concave grating 18 may be replaced by a collimating lens and a prism and a second prism used in place of the plane grating to provide for the recombining of the selected spectral regions. The collimating mirror following the mask may be replaced by several mirrors placed immediately behind the slots so as to direct the light back to a second concave grating which functions to remove the dispersion from the reflected spectral regions and direct the combined light onto the Echelle grating. In that instance, the second concave grating may be chosen to defract the light as a collimated beam which is sent directly to the Echelle grating. In using the Echelle grating in accordance with this invention as a high resolution element without cross-dispersion, by proper preorganization of the spectral energy onto the Echelle grating, a linear detecting device may be used to determine the presence of spectral energy lines. The radiation from the selected spectral regions is collimated onto the Echelle grating. At the Echelle grating, the various wavelengths are separated into modes but with no cross-dispersion as the orders of spectral energy lie one on top the other. This need not present a problem when the wavelength regions have been judiciously preselected so as to not cause a conflict in spectral energy lines piling up on each other. By proper choice of the Echelle grating line spacing and the focal length of the focusing mirror 42, the full spectral range of any order of the spectral energy from the Echelle grating may be fit in the physical length of the preferred linear diode array.

Figures 2, 3:
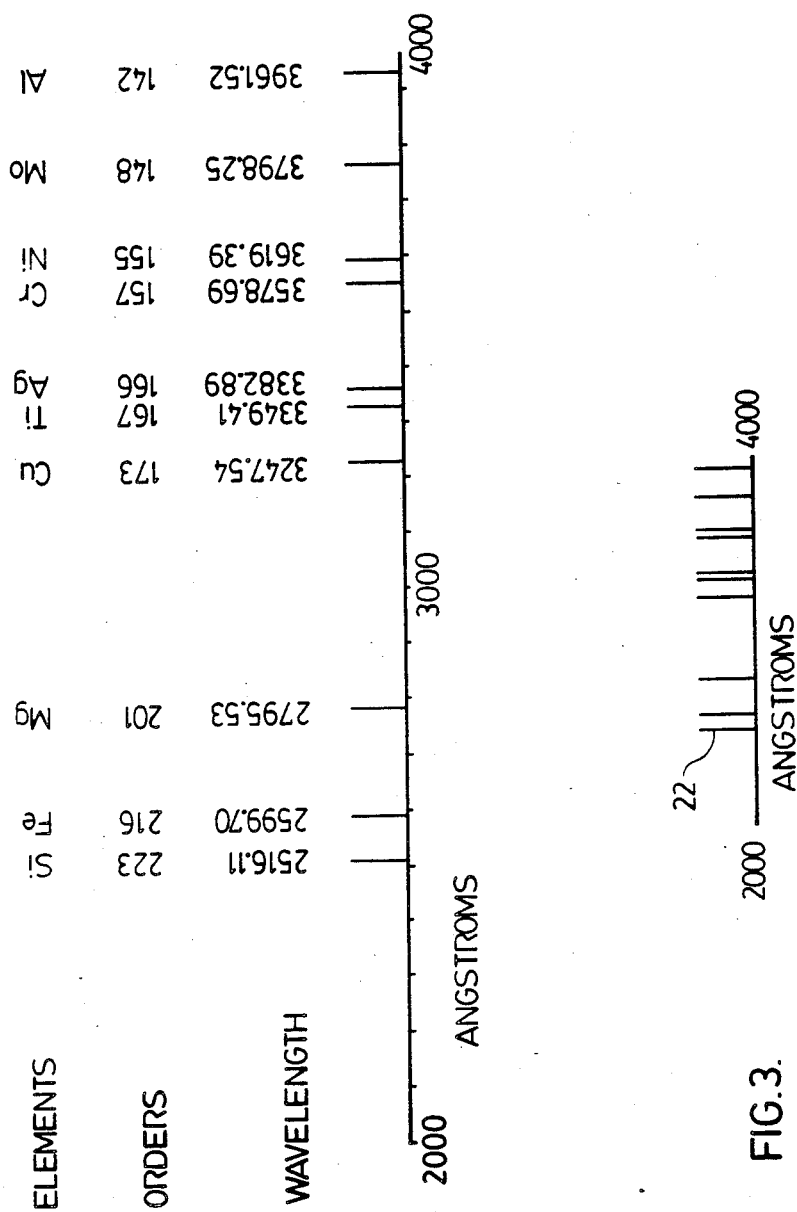
FIG. 2 is a plot showing the relative positions of dispersed incident spectral radiation for a particular analytical analysis at the focal plane. The mask is situated at this focal plane.
FIG. 3 shows the actual position of slots in the mask for selecting regions of the dispersed radiation of FIG. 2.

The plot of FIG. 2 shows the relative location of spectral energy lines along the spectrum as dispersed by the concave grating 18. The mask has slots formed therein so as to only pass the selected spectral lines for silicon, iron, magnesium, copper, titanium, silver, chromium, nickel, molybdenum and aluminum, should they be present in the sample. It is appreciated that for each of these elements, there are many spectral lines in the dispersed spectral energy region from an excited source containing all of these elements.

As shown in FIG. 3, the location in the mask 20 of the slots 22 can be readily calculated to pass only the selected regions of dispersed spectral energy for the elements noted in FIG. 2. Taking into consideration the curvature of mask 22, the relative location and width of the slots can be chosen. Should the mask be formed of suitable material, the slots can be accurately machined into the mask in accordance with the positioning shown in FIG. 3.

FIG. 4 shows the spectral energy lines as dispersed by the Echelle grating when given further dispersion in the cross-direction to provide a two dimensional presentation of the orders of selected spectral regions. The spectral lines as simultaneously selected by the mask 20, when they emerge from the Echelle grating, are located at various orders of the Echelle output. In accordance with standard Echelle spectrometry, a prism is normally used to cross-disperse the radiation reflected from the Echelle grating producing a two dimensional spectrum. On the other hand in accordance with this invention, because of a judicious preselection of the wavelengths to pass through the mask, the output at the Echelle grating provides spectral lines which do not appreciably overlap when the Echelle spectrum is allowed to remain without cross-dispersion.

As shown in FIG. 5, to either side of the centre line of FIG. 4, the spectral energy lines are at predetermined locations along the focal plane. As shown in FIG. 4, the selected wavelength of titanium is furthest to the left and the selected spectral wavelength for aluminum is furthest to the right. The spectral orders of FIG. 4, if vertically compressed, provide the relative location for the spectral energy lines as shown in FIG. 5, which is the unaltered output from the Echelle grating according to this invention. Thus, by the judicious selection of wavelengths to be passed by the mask, assuming the presence of the elements, the selected spectral lines when dispersed with high resolution by the Echelle grating do not appreciably overlap and are distinctly separate along the focal plane of FIG. 5.

The enlarged scale for the spectral lines of FIG. 5, as focused onto a single dimension plane, would appear as shown in FIG. 6 on the preferred linear diode array detector having several sensitive regions which are marked 0 to 1024.

By knowing the characteristics of the optics of the system 10, one can determine, in accordance with standard procedures, the exact location along the linear array of the selected spectral lines. Thus, from a base line, a determination can be made as to whether or not the elements are present. For example, if there is no iron in the sample introduced to the plasma jet, then the line for iron having a wavelength of 2,599.70 Angstroms would not appear at the detector.

In using the optics according to a preferred embodiment of this invention, the linear diode array having an overall length of approximately 20 to 30 mm with 1024 sensitive regions or detector elements can readily determine the presence of spectral energy lines in the spectrum to be analyzed. Knowing in advance which chemical elements are to be detected and knowing the characterisitics of the optics, activation of particular detector elements along the length of the array determines the presence of the corresponding chemical element. According to a preferred embodiment of this invention, the linear diode array may have 40 detector elements per millimeter of length of the detector. This provides a sufficient number of detector elements to determine the existence or non-existence of the selected spectral profile, also known as energy lines along the detector array.

As shown in FIG. 5, to either side of the centre line are the locations in expanded view of the various selected spectral energy lines. The location of the detector elements can be correlated with the spectral energy lines. The positions of detector elements which are actuated confirm the presence of a suspected chemical element in the source. The output from the linear diode array can be processed in many ways. For example, a computer may be used having the necessary logic to process information from the linear diode array and correlate the particular numbered detector elements determined with the existence of chemical elements. In this manner, the computer may be used to confirm to the user the existence or non-existence of the suspected chemical elements in a source.

The linear diode array and associated electronics may be obtained from various sources. A linear diode array having a cooled housing, for example, is obtained from Tracor-Northern of Wisconsin. The output of the linear diode array is interfaced with a computer. The analog signals from the linear diode array are converted to digital signals which are then processed by the computer to confirm which of the suspected chemical elements are present in the sample.

The optical system has particular application in spectrometric analysis where one needs to determine if certain elements are in a source. For example, it may be important to determine if a food composition has harmful lead and other toxic elements present. The location of the slots 22 in the mask 20 are then determined. With the mask in position, if lead is present, the corresponding selected spectral energy line will appear at the linear diode array to confirm the presence of lead. Similarly, oils may be analyzed for certain chemical elements, such as those shown in FIG. 2. A sample of oil may be injected into the plasma jet and a determination made as to whether or not the suspected components as listed in FIG. 2 are present. The spectrometer, therefore, acts as a detective device in that it will determine if particular elements are present. Once it is desired to determine if certain elements are present in the sample for reasons of investigation of toxic susbstance, corrosion problems or utility of the sample, the spectral lines are selected and the appropriate mask is designed.

Due to the fixed nature of the optics for the spectrometer, the unit can be operated in areas where vibration is present. Furthermore, the unit does not require specially designed tables and the like to support the frame for the optics. The only device in the system which may be movable is the mask 20. A holder may be designed to receive the mask 20 and fix it relative to a base line position to thereby locate the slots 22 in the desired regions of the spectrum to permit only those spectral regions to pass through the mask. Therefore, depending upon what combination of chemical elements is to be analyzed, interchangeable masks may be used. The system provides a compact arrangement for the optics which may be readily housed and thereby provide a controlled atmosphere within which the system operates. The housing for the optics may be removed from time to time to permit ready repair. Due to the fixed nature of the optic components, replacement is readily achieved. Since spectral line selection is carried out in low resolution, mechanical tolerances are in general much less restrictive allowing a simpler and less expensive manufacturing process to be used in the construction of the spectrometer.

In addition to a qualitative analysis of elements present in the sample, it is also possible, depending upon the type of detector used, to quantitatively determine the concentration of the detected element in the sample. Depending upon the measured intensity of the spectral line for the sample present, it is possible to determine the concentration knowing the characteristics of the spectral energy emitted by the sample when present at certain concentrations in the plasma. By use of a linear diode array, it is possible to measure the intensity of each spectral profile and by analysis of the data, quantitatively determine the concentrations of the elements in the sample.

The method and apparatus is normally used for sorting spectral energy in the electromagnetic spectrum in particular sorting spectral energy having a wavelength from 1,700 Angstroms to 8,000 Angstroms. The preferred embodiment of the system detects energies in the wavelength region from 2,000 Angstroms to 4,000 Angstroms. This is found to be the most common wavelength region of interest.

The spectrometer optics, according to this invention, provide a very compact arrangement which is inexpensive to manufacture and set up to analyze for a variety of elements in various samples. It involves the use of only a single detector array which is fixed relative to the other optics in the system.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A method of analyzing spectral energy emissions from a source comprising dispersing incident spectral energy, simultaneously transmitting selected multiple spectral regions and rejecting all other regions of said dispersed spectral energy, collecting and further dispersing said simultaneously selected spectral regions of spectral energy and organizing said dispersed selected spectral regions in a detectable spectral energy distribution pattern.

2. A method of claim 1, wherein said incident spectral energy is dispersed at a low dispersion.

3. A method of claim 2, wherein said simultaneously selected spectral regions are redispersed with high resolution.

4. A method of claim 1, wherein collecting said simultaneously selected spectral regions recombines the regions into an essentially undispersed column of spectral energy and dispersing said column of spectral energy to form a dispersion of said simultaneously selected spectral regions.

5. A method of claim 4, wherein said column of spectral energy is dispersed at high resolution of said selected spectral regions.

6. A method of claim 5, wherein an Echelle grating is used in dispersing said column of spectral energy with high resolution of said selected spectral regions.

7. A method of claim 1, or 5, wherein said step of collecting and further dispersing said dispersed selected spectral regions comprises focusing and redispersing selected spectral regions into a focal plane containing said spectral energy distribution pattern.

8. A method of claim 1, or 5, wherein said step of collecting and further dispersing said dispersed selected spectral regions comprises focusing and redispersing selected spectral regions into a focal plane containing said spectral energy distribution pattern, said spectral energy distribution pattern is presented on a curvilinear focal plane.

9. A method of claim 1, 5 or 6, wherein said step of organizing said dispersed selected spectral regions comprises focusing said dispersed selected spectral regions into a linear focal plane containing said spectral energy distribution pattern, detecting spectral energy lines of said focused selected spectral regions by use of a linear detecting device with many channels.

10. A method of claim 1, 5 or 6, wherein said step of organizing said dispersed selected spectral regions comprises focusing said dispersed selected spectral regions into a linear focal plane containing said spectral energy distribution pattern, detecting spectral energy lines of said focused selected spectral regions by use of a linear detecting device selected from the group consisting of photographic plate, linear diode array, television camera and multiple anode microchannel photomultiplier.

11. A method of claim 1, 5 or 6, wherein said selected spectral regions are transmitted in a manner to avoid appreciable overlap of important spectral energy lines of said organized spectral energy distribution pattern.

12. A method for spectrometrically determining the presence of one or more suspected components in a sample comprising passing incident spectral energy from an energized source including said sample through a slit to isolate incident spectral energy from said source, dispersing said incident spectral energy and focusing said dispersed spectral energy at a focal plane, simultaneously selecting predetermined regions of said focused dispersed spectral energy at said focal plane, and rejecting other regions, collimating and recombining said selected spectral regions and directing them onto an Echelle grating to disperse with high resolution said selected spectral regions, focusing said selected spectral regions dispersed by said Echelle grating onto a focal plane to form highly resolved spectral energy lines in said selected spectral regions, detecting the presence and relative location of said spectral energy lines to confirm the presence of one or more suspected components in said sample.

13. A method of claim 12, wherein said incident spectral energy is dispersed with low resolution of spectral energy lines of said spectral energy.

14. A method of claim 13, wherein said selected spectral regions dispersed by said Echelle grating are focused into a linear focal plane containing said spectral energy lines.

15. A method of claim 14 for determining spectral energy in the electromagnetic spectrum having a wavelength ranging from 1700 A to 8000 A, wherein the presence of said selected focused spectral regions is detected by a linear diode array having sensitive regions at said focal plane for detecting a spectral profile of each of said spectral energy lines.

16. A method of claim 15, wherein optical components are used to process said incident spectral energy, said optical components being fixed in angular positions for the analysis of any sample.

17. Apparatus for analyzing spectral energy emissions from a source comprising first means for dispersing incident spectral energy to form a spectral dispersion, means for simultaneously selecting multiple desired spectral regions from said spectral dispersion and rejecting all other spectral regions, means for collecting together the multiple selected regions, second means for dispersing said collection of multiple selected spectral regions which are present in said spectral energy, and means for organizing such dispersed spectral regions in a detectable spectral energy distribution pattern.

18. Apparatus of claim 17, wherein said first dispersing means disperses said incident spectral energy with low dispersion and provides low resolution of spectral energy lines of said spectral energy.

19. Apparatus of claim 18, wherein said second dispersing means disperses said selected spectral regions to provide high resolution of spectral energy lines of said selected spectral regions.

20. Apparatus of claim 17, wherein said collecting means includes means for recombining said selected spectral regions into a column of spectral energy and directing said column of spectral energy onto said second dispersing means.

21. Apparatus of claim 20, wherein said second dispersing means disperses said column of spectral energy to provide high resolution of spectral energy lines of said selected spectral regions.

22. Apparatus of claim 21, wherein said second dispersing means is an Echelle grating.

23. Apparatus of claim 17, 21 or 22, wherein said organizing organizing means comprises optical means for focusing said dispersed spectral regions into a focal plane containing said spectral energy distribution pattern.

24. Apparatus of claim 17, 21 or 22, wherein said organizing means focuses said dispersed spectral regions onto a linear focal plane.

25. Apparatus of claim 22, wherein said first dispersing means, said selecting means, said recombining means, said Echelle grating and said organizing means have their relative angular positions fixed.

26. Apparatus of claim 17, wherein said spectral energy range to be analyzed varies in wavelength from 1700 A to 8000 A.

27. Apparatus of claim 26, wherein said spectral energy range to be analyzed varies in wavelength from 2000 A to 4000 A.

28. Apparatus of claim 17, 21, or 22, wherein said selecting means selects said spectral region in a manner to avoid appreciable overlap of important spectral energy lines of said detectable spectral energy distribution pattern.

29. Apparatus of claims 26 or 27, wherein said first dispersing means comprises a concave reflective grating, said concave grating focusing said dispersed spectral energy at a focal plane, said selection means being positioned along said focal plane.

30. Apparatus of claim 29, wherein said selection means comprises a mask having a plurality of parallel slots, the relative location of said slots along said focal plane being predetermined by the location along said focal plane of said spectral regions to be selected so as to enable said spectral regions to pass through said slots while blocking other spectral regions.

31. Apparatus of claim 30 further comprising means for recombining said selected spectral regions into a column of spectral energy and directing said column of spectral energy onto said second dispersing means.

32. Apparatus of claim 31, wherein said recombining means comprises a concave reflective mirror for collimating and reflecting said selected spectral regions to converse a planar reflective grating for recombining said selected spectral regions into an essentially single column and directing the formed column of recombined spectral energy regions onto said second dispersing means.

33. Apparatus of claim 32, wherein said second dispersing means comprises an Echelle grating for dispersing said column of spectral energy regions with high resolution of spectral energy lines of said spectral energy regions.

34. Apparatus of claim 33, wherein said organizing means comprises a concave reflective mirror for focusing said dispersed selected spectral regions into a linear focal plane of a pattern of spectral energy lines.

35. An Echelle spectrometer for spectrometrically determining the presence of one or more suspected components in a sample comprising an entrance slit to isolate incident spectral energy from an energized source including said sample, first means for dispersing said isolated incident spectral energy and focusing said dispersed spectral energy at a first focal plane, means for simultaneously selecting spectral regions of one or more of said suspected components at said focal plane of said dispersed incident spectral energy while rejecting other spectral regions, means for collimating and recombining said selected spectral regions which are present due to an existence of one or more suspected components and directing them onto an Echelle grating to disperse with high resolution said existing selected spectral regions, means for focusing said selected spectral regions dispersed by said Echelle grating onto a second focal plane of highly resolved spectral energy lines of said selected spectral regions and means for detecting the presence and relative location of said spectral energy lines.

36. A spectrometer of claim 35, wherein said selection means comprises a stationary mask having a plurality of slots therein, all of the slots being transparent and separated by mask material which is opaque to unwanted spectral regions which are not necessary in confirming the presence of suspected one or more components of a sample, said mask being positioned at said first focal plane to pass through said slots only selected spectral regions.

37. A spectrometer of claim 36, wherein means 36 is provided for mounting said mask at said first focal plane, the relative location and number of slots in said mask being predetermined by the location of said focal plane of selected spectral regions corresponding to the one or more components to be detected, said mask being interchangeable with other masks having other slot arrangements to enable detection of a variety of components and their mixtures in a sample.

38. A spectrometer of claim 37, wherein said first means for dispersing said incident spectral energy comprises a concave reflective grating, said concave grating focusing said dispersed spectral energy at said first focal plane.

39. A spectrometer of claim 38, wherein said collimating and recombining means comprises a first concave reflective mirror for collimating and reflecting said selected spectral regions to converge at a planar reflective grating located near said concave grating for recombining and forming a column of said selected spectral regions which are present and directing such formed column of recombined spectral energy regions onto said Echelle grating, the curvature of said first concave reflective mirror being one-half the curvature of said concave grating, the orientation and line spacing of said concave grating being the same as the orientation and line spacing of said planar reflective grating.

40. A spectrometer of claim 39, wherein the final focusing means comprises a second concave mirror for focusing said dispersed selected regions into a linear focal plane of a pattern of spectral energy lines.

41. A spectrometer of claim 40, wherein said detecting means comprises a linear diode array having a plurality of distinct sensitive regions along said linear focal plane for detecting the presence of spectral energy lines of said spectral regions.

42. A spectrometer of claim 40, wherein said selected spectral regions are within the electromagnetic spectrum having a wavelength ranging from 2000 A to 4000 A.

43. A spectrometer of claim 40, wherein said entrance slit, said concave reflective grating, said mask, said first concave mirror, said planar grating, said Echelle grating, said second concave mirror and said detector means have their relative angular positions fixed for determining any component of any sample.

44. A spectrometer of claim 43, wherein said concave reflective grating is adapted to disperse said incident spectral energy with low dispersion, the low dispersion being defined in the order of 35 Angstroms per mm for the central wavelength of 3000 A.

45. Apparatus of claim 36, wherein said selecting means selects said spectral regions in a manner to avoid appreciable overlap of spectral energy lines in said organized spectral energy distribution pattern.

* * * * *